（12） United States Patent
Isaka et al.

(10) Patent No.: US 8,899,129 B2
(45) Date of Patent: Dec. 2, 2014

(54) STEERING DEVICE FOR CONSTRUCTION MACHINE

(75) Inventors: Wataru Isaka, Mito (JP); Ei Takahashi, Ushiku (JP); Kazunori Komatsu, Kasumigaura (JP); Shigeru Kitagami, Kanazawa (JP); Yuichi Koshizaka, Kanazawa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/883,628

(22) PCT Filed: Dec. 14, 2011

(86) PCT No.: PCT/JP2011/078903
§ 371 (c)(1),
(2), (4) Date: May 6, 2013

(87) PCT Pub. No.: WO2012/096090
PCT Pub. Date: Jul. 19, 2012

(65) Prior Publication Data
US 2014/0109715 A1    Apr. 24, 2014

(30) Foreign Application Priority Data

Jan. 10, 2011 (JP) .................................. 2011-2605
Jan. 10, 2011 (JP) .................................. 2011-2606

(51) Int. Cl.
*B62D 1/187* (2006.01)
*B62D 1/183* (2006.01)
*E02F 3/34* (2006.01)
*E02F 9/00* (2006.01)
*E02F 9/16* (2006.01)

(52) U.S. Cl.
CPC .............. *B62D 1/187* (2013.01); *B62D 1/183* (2013.01); *E02F 3/34* (2013.01); *E02F 9/00* (2013.01); *E02F 9/16* (2013.01)
USPC ............................................ 74/493; 280/775

(58) Field of Classification Search
CPC .......... B62D 1/183; B62D 1/187; B62D 1/189; E02F 9/16; E02F 9/166
USPC ............................................ 280/775; 74/493
See application file for complete search history.

(56) References Cited

U.S. PATENT DOCUMENTS

| 3,628,396 A | * | 12/1971 | Grobowski | 74/493 |
| 2004/0261564 A1 | * | 12/2004 | Sato | 74/492 |
| 2014/0049029 A1 | * | 2/2014 | Dooley et al. | 280/775 |

FOREIGN PATENT DOCUMENTS

| JP | 60-209363 A | 10/1985 |
| JP | 1-93167 U | 6/1989 |
| JP | 6-47077 U | 6/1994 |
| JP | 11-321665 A | 11/1999 |
| JP | 2003-027524 A | 1/2003 |
| JP | 2007-120220 A | 5/2007 |
| JP | 2008-201190 A | 9/2008 |

* cited by examiner

*Primary Examiner* — Paul N Dickson
*Assistant Examiner* — Timothy Wilhelm
(74) *Attorney, Agent, or Firm* — Mattingly & Malur, PC

(57) ABSTRACT

A tilt-up mechanism for tilting up an upper column of a steering column from a drive position to a tilt-up position is configured independently from a tilt angle adjusting mechanism and a column length adjusting mechanism. When an operator who is to get on/off an operator's seat steps on and operates a pedal of the tilt-up mechanism, an engaged state of a lock pin with respect to a tilt-up member is disengaged. The tilt-up member is rotated around a support shaft, by a spring force of a tilt-up spring, whereby the upper column is tilted up together with a steering wheel in a direction (A) away from the operator's seat. At this time, the tilt angle and the column length can be held at positions adjusted in advance.

10 Claims, 10 Drawing Sheets

STEERING DEVICE FOR CONSTRUCTION MACHINE

TECHNICAL FIELD

The present invention relates to a steering device for construction machine configured to perform steering by a steering wheel manipulation such as a wheel loader, a wheel type hydraulic excavator or the like, for example.

BACKGROUND ART

In general, a steering device for performing a steering operation of a steering column arranged on the front side of an operator's seat from a steering wheel is mounted on a wheel type construction machine known as a wheel loader, a wheel type hydraulic excavator and the like. In this type of the conventional art steering device for construction machine, a mechanism for tilting the steering column to the front/rear is provided so that the steering wheel is not in the way when an operator gets on/off the operator's seat.

This mechanism is called a tilt angle adjusting mechanism, for example, and adjusts a tilt angle of the steering column by tilting the steering column to a direction to be brought closer to the operator's seat and a direction to be spaced away from the operator's seat. On the other hand, some mechanisms are provided with a column length adjusting mechanism for adjusting a column length of the steering column in the upper-lower direction. An operator seated on the operator's seat can variably adjust a position of the steering wheel in accordance with the preference by manually operating the tilt angle adjusting mechanism and the column length adjusting mechanism (Patent Documents 1 and 2).

PRIOR ART DOCUMENT

Patent Document

Patent Document 1: Japanese Patent Laid-Open No. 2003-27524 A
Patent Document 2: Japanese Patent Laid-Open No. 2007-120220 A

SUMMARY OF THE INVENTION

Incidentally, the steering column according to the above-described conventional art has the tilt angle adjusted by the tilt angle adjusting mechanism and the column length adjusted by the column length adjusting mechanism. By manipulating a single manual lever in one direction in this state, the tilt angle adjusting mechanism and the column length adjusting mechanism are locked together. Moreover, when the manual lever is operated in the other direction, the tilt angle adjusting mechanism and the column length adjusting mechanism are unlocked together.

On the other hand, when the operator is to get on/off the operator's seat, since the steering wheel is in the way, the manual lever is operated in the other direction so as to unlock the locked state and to tilt the steering column in the direction spaced away from the operator's seat by means of the tilt angle adjusting mechanism in many cases. However, when the steering column is tilted in the direction away from the operator's seat, the previous adjusted position is lost.

Thus, the operator needs to perform the adjusting work of the tilt angle from the beginning again when he/she gets on the operator's seat next time, which causes a problem that tilt angle adjustment of the steering column takes labor. Moreover, in the column length adjusting mechanism of the steering column, too, an adjusted position of the column length might be changed due to an influence of movement of the tilt angle adjusting mechanism when the manual lever is operated to a direction of release. As a result, the operator who has got on the operator's seat needs to perform the adjusting work of the tilt angle and the adjusting work of the column length each time, and there is a problem that workability during getting on/off cannot be improved.

In view of the above-discussed problems with the conventional art, it is an object of the present invention to provide a steering device for construction machine capable of facilitating getting on/off the operator's seat and simplifying the tilt angle adjusting work and the column length adjusting work by providing a tilt-up mechanism for the steering column separately from the tilt angle adjusting mechanism and the column length adjusting mechanism for the steering column.

(1) In order to solve the above-described problems, the present invention is characterized in that, a steering device for construction machine comprises a steering column arranged on the front side of an operator's seat of a construction machine and steered by a steering wheel; a tilt angle adjusting mechanism for adjusting a tilt angle of the steering column; and a column length adjusting mechanism for adjusting a column length of the steering column, characterized in that: a tilt-up mechanism for tilting up the steering column together with the steering wheel to a tilt-up position away from the operator's seat with respect to a drive position close to the operator's seat is provided; the tilt-up mechanism is provided independently from the tilt angle adjusting mechanism and the column length adjusting mechanism; and the tilt-up mechanism is configured to perform a tilt-up operation of the steering column in a state where an adjusted position of the tilt angle and an adjusted position of the column length are maintained.

As described above, according to the present invention, since the tilt-up mechanism independent from the tilt angle adjusting mechanism and the column length adjusting mechanism is employed, once the tilt angle adjustment of the steering column is performed by the tilt angle adjusting mechanism and a column length adjustment is performed by the column length adjusting mechanism, the respective adjusted positions can be maintained after that. As a result, the operator who gets on/off the operator's seat can tilt up the steering column together with the steering wheel in a direction away from the operator's seat only by operating the tilt-up mechanism and at this time, too, the tilt angle and the column length can be maintained at the positions adjusted in advance. Thus, when the operator gets on the operator's seat next time, the adjusting works of the tilt angle and the column length do not have to be performed again, and workability during getting on/off can be drastically improved.

Moreover, in a case where an operator different from the operator in the previous work is to get on the operator's seat, by manually operating the tilt angle adjusting mechanism and the column length adjusting mechanism in a state where this operator returns the steering column together with the steering wheel from the tilt-up position to the drive position, the position of the steering wheel can be adjusted in accordance with the operator's body type and preference. At the subsequent getting on/off, the steering column can be tilted to the tilt-up position and the drive position only by operating the tilt-up mechanism, and the tilt-up operation can be repeated while the previous adjusted position is maintained.

(2) According to the present invention, the tilt-up mechanism is provided with a pedal operated by the operator seated on the operator's seat and is configured to tilt up the steering column from the drive position to the tilt-up position in accordance with the operation of the pedal.

With this arrangement, when the operator seated on the operator's seat operates the pedal, the tilt-up mechanism can tilt up the steering column together with the steering wheel from the drive position close to the operator's seat to the tilt-up position away from the operator's seat.

(3) According to the present invention, the steering wheel is provided on an upper end of the steering column, and the tilt-up mechanism is configured to allow the steering column to return from the tilt-up position to the drive position by performing an operation of pulling the steering wheel to the operator side by the operator.

With this arrangement, when the operator performs the operation of pulling the steering wheel provided on the upper end of the steering column to the operator side, the tilt-up mechanism can allow the steering column from the tilt-up position to the drive position.

(4) According to the present invention, the steering column is composed of a lower column accommodating a lower shaft for steering having the lower end side fixed to the side of a floor surface of the operator's seat and extending in the upper-lower direction, an upper column accommodating an upper shaft for steering attached to the upper side of the lower column movably in the front-rear direction and the upper-lower direction and extending in the upper-lower direction, and a joint member provided between the lower shaft and the upper shaft and transmitting a steering operation of the steering wheel between the shafts; the tilt angle adjusting mechanism performs adjustment of the tilt angle by tilting the upper column in the front-rear direction with respect to the lower column; and the column length adjusting mechanism performs adjustment of the column length by moving the upper column in the upper-lower direction with respect to the lower column.

By configuring as above, when the operator seated on the operator's seat adjusts the position of the steering wheel in accordance with the body type and preference of his/her own in a state where the steering column is returned from the tilt-up position to the drive position close to the operator's seat, the tilt angle adjusting mechanism and the column length adjusting mechanism can be manually operated. The tilt angle adjusting mechanism can adjust the tilt angle of the steering column by tilting the upper column with respect to the lower column in the front-rear direction. On the other hand, the column length adjusting mechanism can adjust the column length of the steering column by moving the upper column in the upper-lower direction with respect to the lower column.

(5) According to the present invention, between the lower column and the upper column of the steering column, a tilt-up member extending in the upper-lower direction between the both and constituting a part of the tilt-up mechanism is provided; on the tilt-up member, a pivot portion located in the middle of the length direction and rotatably attached to the lower column and an elongate hole portion for tilt angle adjustment arranged on the upper side of the pivot portion and to which the upper column is connected capable of adjusting the tilt angle are provided; and the tilt angle adjusting mechanism includes a connecting member provided on the upper column, connecting the upper column to the elongate hole portion of the tilt-up member, and maintaining the adjusted position of the tilt angle and a tilt lever which releases the connected state of the connecting member by a rotating operation from the outside so that the upper column can relatively move along the elongate hole portion of the tilt-up member when the tilt angle is adjusted.

With this arrangement, by operating the tilt lever of the tilt angle adjusting mechanism, the connecting member can be rotated from the outside and thereby the connected state can be released, and the upper column can be relatively moved along the elongate hole portion of the tilt-up member in this state. As a result, the upper column can be tilted in the front-rear direction with respect to the lower column within a range of the elongate hole portion, and the tilt angle of the steering column can be adjusted. After the adjustment of the tilt angle, by operating the tilt lever in the opposite direction, the connecting member can be rotated from the outside so as to bring the upper column into the connected state, and the tilt angle can be maintained at the adjusted position.

(6) According to the present invention, the column length adjusting mechanism has a length adjusting portion formed on the upper column and extending in the upper-lower direction; and the length adjusting portion is configured to allow the upper column to move in the upper-lower direction with respect to the lower column when the connected state of the connecting member is released by the tilt lever and regulates movement of the upper column in the upper-lower direction with respect to the lower column so as to maintain the column length at an arbitrary adjusted position when the connecting member is returned to the connected state by the tilt lever.

By configuring as above, by releasing the connected state of the connecting member by operating the tilt lever, the length adjusting portion can allow the upper column to move in the upper-lower direction with respect to the lower column and can adjust the column length of the steering column. After that, by operating the tilt lever in the opposite direction so as to return the connecting member to the connected state, the relative movement of the upper column with respect to the lower column can be regulated, and the column length can be maintained at an arbitrary adjusted position.

(7) On the other hand, according to the present invention, the steering column includes a lower column having the lower end side fixed to a floor surface side of the operator's seat and extending in the upper-lower direction and an upper column provided on the upper side of the lower column and tilted up by the tilt-up mechanism with respect to the lower column; and the tilt-up mechanism is composed of a tilt-up member arranged extending in the upper-lower direction between the lower column and the upper column and having an intermediate portion in the length direction rotatably attached to the lower column and the upper side connected to the upper column; a lock pin provided on the lower column side capable of displacement in the upper-lower direction and engaged with the tilt-up member all the time so as to position the upper column at the drive position; and a spring member provided between the tilt-up member and the lower column and tilting up the upper column together with the tilt-up member when the engagement of the lock pin with respect to the tilt-up member is disengaged.

By configuring as above, while the lock pin is engaged with the tilt-up member rotatably attached to the lower column, the upper column can be positioned at the drive position close to the operator's seat, and the operator can easily perform the steering operation using the steering wheel in this state. On the other hand, in a case where the steering wheel is in the way when the operator stands up and leaves the operator's seat, by disengaging the lock pin with the tilt-up member, the spring member can tilt up the upper column together with the tilt-up member, and the steering wheel can be moved to the tilt-up position away from the operator's seat. Therefore, for the operator, only by operating the tilt-up mechanism, the steering column can be tilted up together with the steering wheel in a direction away from the operator's seat, and workability in getting on/off can be drastically improved.

(8) According to the present invention, between the lower column and the lock pin, a biasing member for biasing the lock pin toward the tilt-up member all the time is provided. In this case, the lock pin can be biased by the biasing member toward the tilt-up member, and the tilt-up operation of the tilt-up member can be regulated by the lock pin, and the upper column can be kept locked at the drive position.

(9) According to the present invention, an engage hole engaged with the lock pin is provided in the tilt-up member; and the lock pin is configured to be formed such that a portion engaged with the engage hole has a tapered shape. By means of this configuration, engagement and disengagement of the lock pin with the engage hole of the tilt-up member can be carried out smoothly, and operability when the upper column is tilted to the drive position and the tilt-up position can be improved.

(10) According to the present invention, the tilt-up mechanism is provided with a pedal provided on the lower column side and rotated and operated by the operator seated on the operator's seat; and the lock pin is configured to be engaged with the tilt-up member until the operator operates the pedal and the engagement with the tilt-up member is disengaged when the pedal is operated.

With this arrangement, when the operator seated on the operator's seat operates the pedal, engagement of the lock pin with the tilt-up member can be easily disengaged, and with that, the upper column can be immediately tilted up from the drive position to the tilt-up position by the spring member.

(11) According to the present invention, on the lower column, a pin holder located on the lower side of the tilt-up member and holding the lock pin capable of displacement is provided by fixing; and between the pin holder and the lock pin, a biasing member for biasing the lock pin toward the tilt-up member all the time is provided. According to this configuration, the lock pin can be held by the pin holder provided on the lower column capable of displacement at a position opposite to the tilt-up member in the upper-lower direction.

(12) According to the present invention, in the pin holder, a pin operating member for displacing the lock pin in the upper-lower direction against the biasing member is provided; the base end side of the pedal stepped on and operated on the distal end side by the operator seated on the operator's seat is connected to the pin operating member; and by operating the pin operating member by the pedal, engagement between the tilt-up member and the lock pin is configured to be disengaged against the biasing member.

In this case, by rotating the pin operating member provided in the pin holder by the pedal operation, the lock pin can be displaced in the upper-lower direction against the biasing member in the pin holder, and engagement and disengagement of the lock pin with the engage hole of the tilt-up member can be carried out by the pin operating member.

MODE FOR CARRYING OUT THE INVENTION

Figure 1:
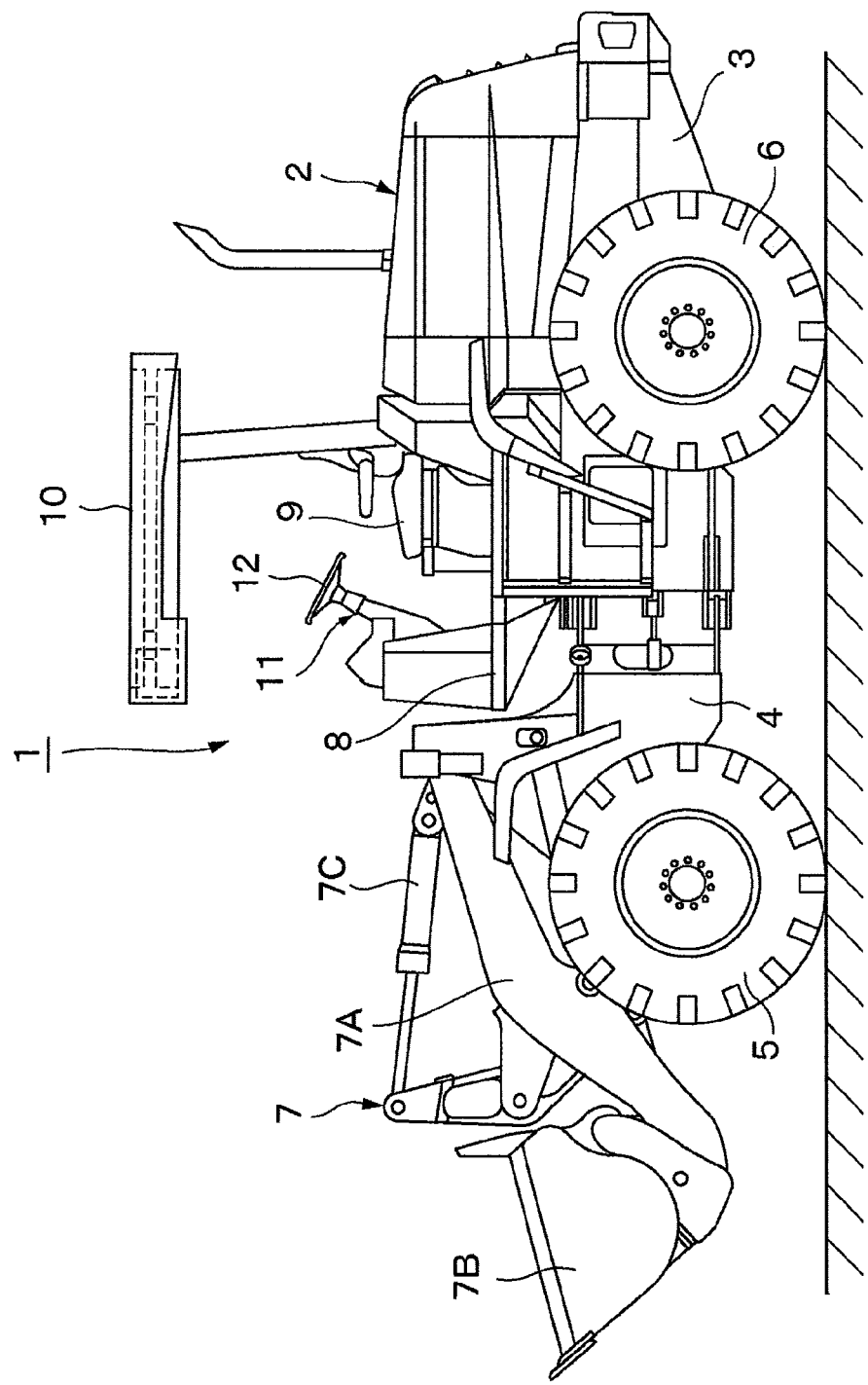
FIG. 1 is a front view illustrating a wheel loader on which a steering device according to an embodiment of the present invention is mounted.

A steering device for a construction machine according to an embodiment of the present invention will be described below in detail by referring to the attached drawings and by using a case applied to a wheel loader as an example.

In the figures, designated at 1 is a wheel loader as a construction machine employed in this embodiment. This wheel loader 1 has a vehicle body 2 capable of being self-propelled by front wheels 5 and rear wheels 6 which will be described later. The vehicle body 2 of the wheel loader 1 is composed of a rear vehicle body 3 and a front vehicle body 4 coupled to the front side of the rear vehicle body 3. When the wheel loader 1 is to be steered, the front vehicle body 4 is made to rock in the left-right direction with respect to the rear vehicle body 3, whereby a running direction is steered.

Left and right front wheels 5 are provided on the front vehicle body 4, and left and right rear wheels 6 are provided on the rear vehicle body 3. These front wheels 5 and rear wheels 6 constitute the wheels of the wheel loader 1 and are four-wheel driven by a hydraulic motor (not shown) for running using a hydraulic closed circuit (HST), for example. The wheel loader 1 as a construction machine employed in the present invention is not limited to the four-wheel drive vehicles but may be a vehicle configured to drive only the front wheels 5 or the rear wheels 6, for example.

A working mechanism 7 is provided on the front side of the vehicle body 2. This working mechanism 7 includes a boom 7A attached to the front vehicle body 4 capable of moving upward/downward, a loader bucket 7B rotatably attached on the distal end side of the boom 7A, a pair of left and right boom cylinders (not shown) for elevating up and down and driving the boom 7A, and a bucket cylinder 7C for rotating the loader bucket 7B up and down. The working mechanism 7 performs an excavating work or a scooping work of earth and sand, for example, by using the loader bucket 7B.

A floor panel 8 is provided on the front side of the rear vehicle body 3, and the floor panel 8 constitutes a floor surface on which an operator's seat 9 is installed. Above the floor panel 8, a canopy 10 covering the operator's seat 9 from above is provided. On the upper surface side of the floor panel 8, a steering device 11 which will be described later is provided at a position in the front of the operator's seat 9 and a driving pedal and an operation lever (none of them is shown) are also provided.

An operator seated on the operator's seat 9 operates a steering wheel 12 which will be described later and controls the running direction of the vehicle body 2 by rocking the front vehicle body 4 in the left-right direction. Moreover, the operator operates the working mechanism 7 by operating the operation lever. On the other hand, on the rear side of the rear vehicle body 3, an engine which becomes a prime mover of the wheel loader 1 is mounted together with a hydraulic pump (none of them is shown).

Designated at 11 is a steering device employed in this embodiment, and the steering device 11 includes a steering column 13 steered by the steering wheel 12, a tilt-up mechanism 25, a tilt angle adjusting mechanism 33, and a column length adjusting mechanism 37, which will be described later.

Designated at 13 is the steering column located on the floor panel 8 and arranged on the front side of the operator's seat 9. This steering column 13 includes a lower column 14 having its lower end side fixed onto the floor panel 8 on the front side of the operator's seat 9 and an upper column 16 which will be described later and attached on the upper side of the lower column 14 movably in the front-rear direction and the upper-lower direction. The steering column 13 is tilted between a drive position indicated by a solid line and a tilt-up position indicated by a two-dot chain line in FIG. 3. That is, the upper column 16 of the steering column 13 is made to rock in the front-rear direction (a tilt-up position direction A and a drive position direction B in FIGS. 2 and 3) of the vehicle with respect to the lower column 14.

On the lower end side of the lower column 14, an installation plate 14A detachably installed on the floor panel 8 is provided. The lower column 14 is installed upright on the floor panel 8 through the installation plate 14A and constitutes a fixing stand. On the upper end side of the lower column 14, a pair of left and right axial support portions 14B each made of a cylindrical bush are provided. To each of the axial support portions 14B, the upper column 16 is connected through a tilt-up member 26 rotatably in the front-rear direction of the vehicle by support shafts 31 and 32 which will be described later.

Figure 10:
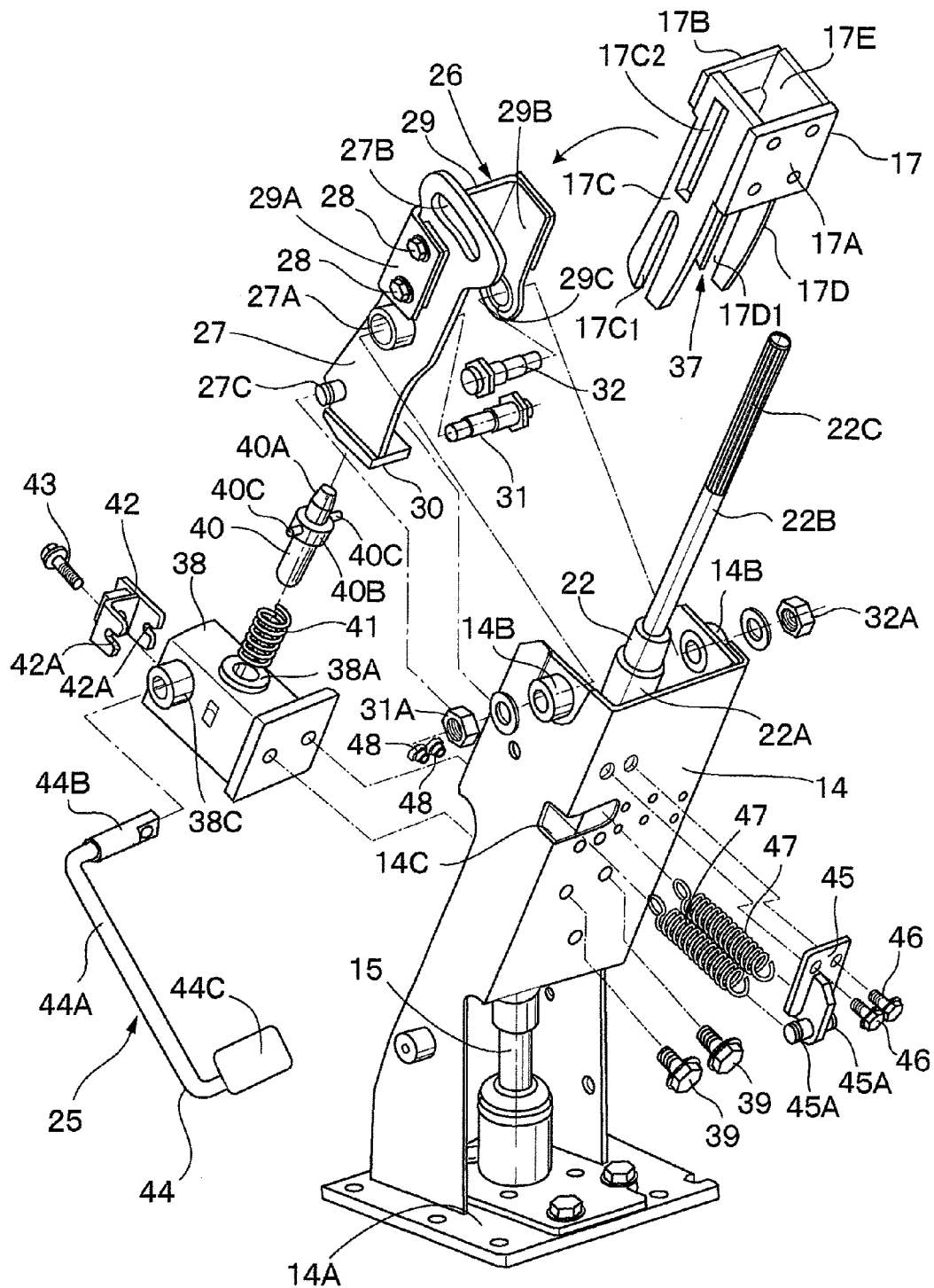
FIG. 10 is an exploded perspective view illustrating the lower column, the tilt-up mechanism and the like of the steering device.

In the lower column 14, a notched hole 14C is provided at a position on the lower side than the axial support portions 14B, and a tilt-up spring 47 which will be described later is fitted in this notched hole 14C as illustrated in FIG. 10. In this case, in order to avoid contact and interference between a lower shaft 15 accommodated in the lower column 14 and the tilt-up spring 47, the notched hole 14C is arranged closer to one side (left side, for example) in the both left and right sides of the lower column 14.

The lower shaft 15 is rotatably provided in the lower column 14. This lower shaft 15 is connected to an upper shaft 21 which will be described later through a joint member 22 in order to transmit a steering operation of the steering wheel 12 to a steering cylinder (not shown) made of a hydraulic cylinder. The steering operation of the steering wheel 12 is transmitted to the lower shaft 15 from the upper shaft 21 through the joint member 22.

The upper column 16 is provided on the upper side of the lower column 14. This upper column 16 is tilted around the support shafts 31 and 32 which will be described later as rotation centers with respect to the lower column 14 to the drive position indicated by the solid line and the tilt-up position indicated by the two-dot chain line in FIG. 3. Here, if the tilt angle adjusting mechanism 33 which will be described later is to be used, a tilt angle of the upper column 16 with respect to the lower column 14 (that is, an inclination angle in the tilt-up position direction A and the drive position direction B in FIGS. 2 and 3) is adjusted. In a case where the column length adjusting mechanism 37 which will be described later is to be used, a height position of the upper column 16 with respect to the lower column 14 is adjusted in the upper-lower direction (that is, the column length is in a height direction C in FIGS. 2 and 3).

Figure 8:
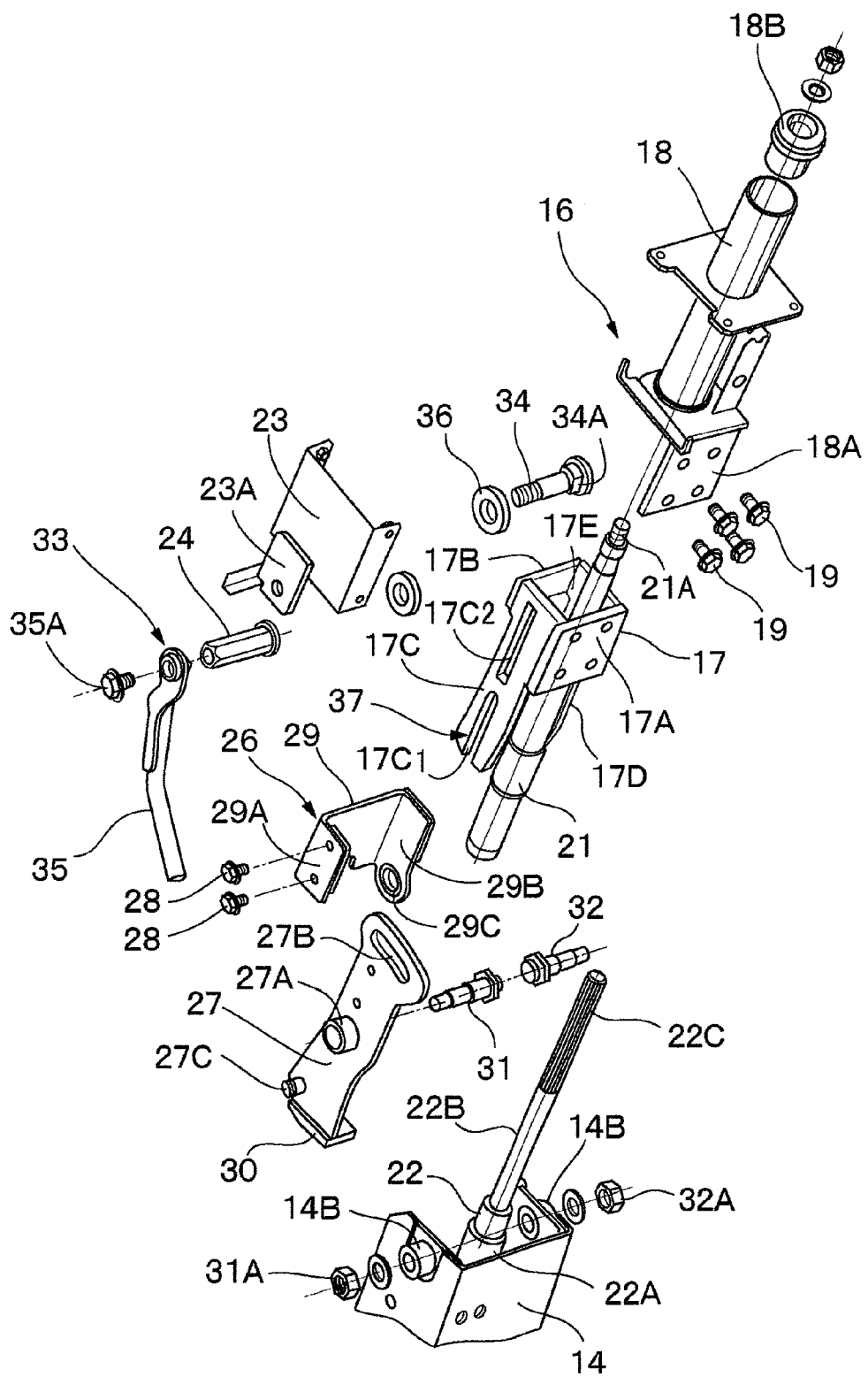
FIG. 8 is an exploded perspective view illustrating an upper column, a lower column, the tilt-up mechanism, the tilt angle adjusting mechanism, the column length adjusting mechanism and the like of the steering device.
Figure 9:
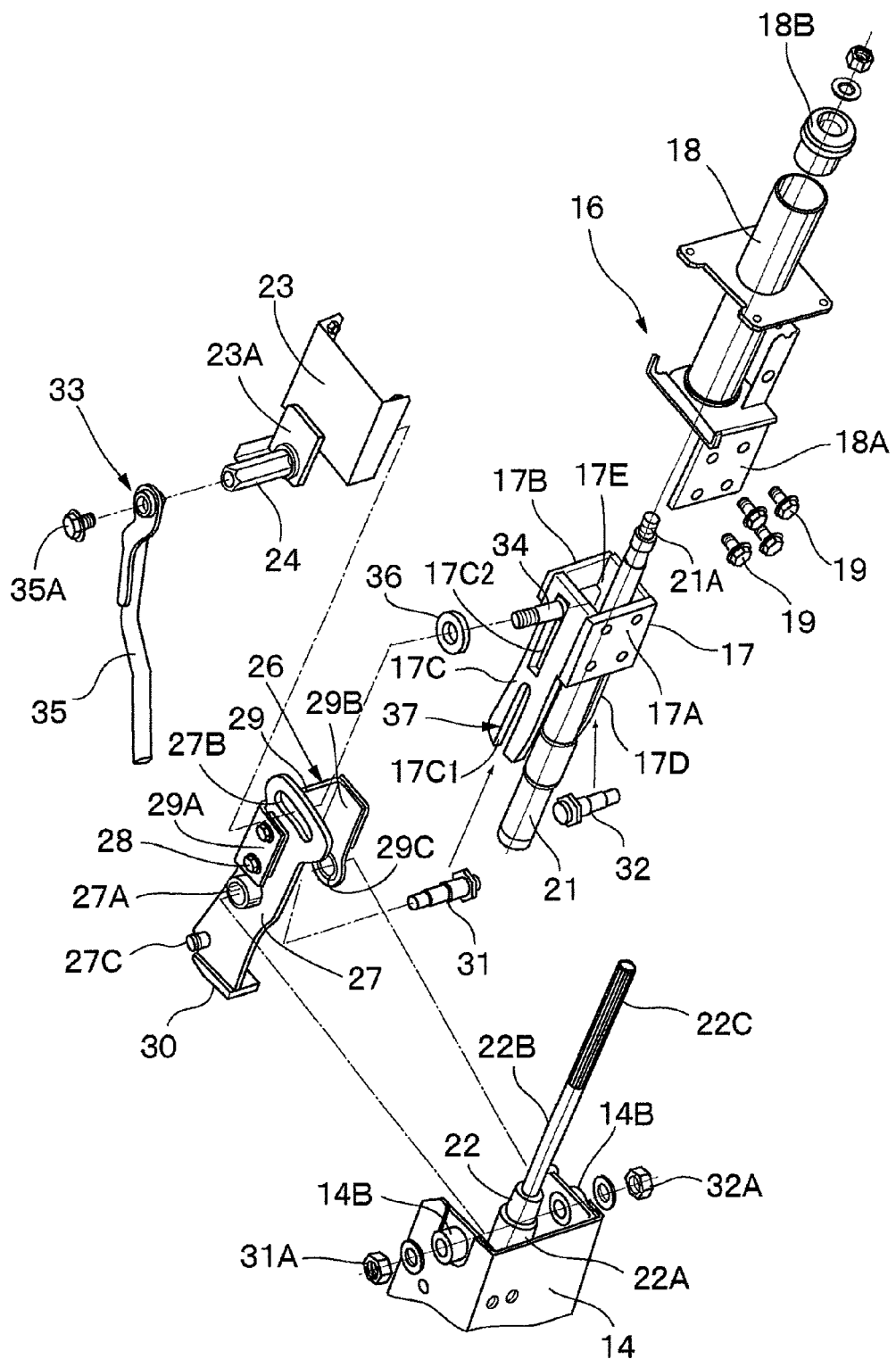
FIG. 9 is an exploded perspective view illustrating a state where a rocking plate and a bent plate in FIG. 8 are assembled as the tilt-up member.

Thus, as illustrated in FIGS. 8 and 9, the upper column 16 includes a lower-side column frame 17, a mounting post 18 to be mounted on the upper side of the column frame 17, and a lever supporter 23 which will be described later. Inside the upper column 16, the upper shaft 21 which will be described later is rotatably accommodated. The column frame 17 is constituted as a square frame body by a front plate portion 17A, a rear plate portion 17B, a left side plate portion 17C, and a right side plate portion 17D. Inside the column frame 17, a space portion 17E into which the upper shaft 21 is inserted in the upper-lower direction with a gap is formed.

Figure 6:
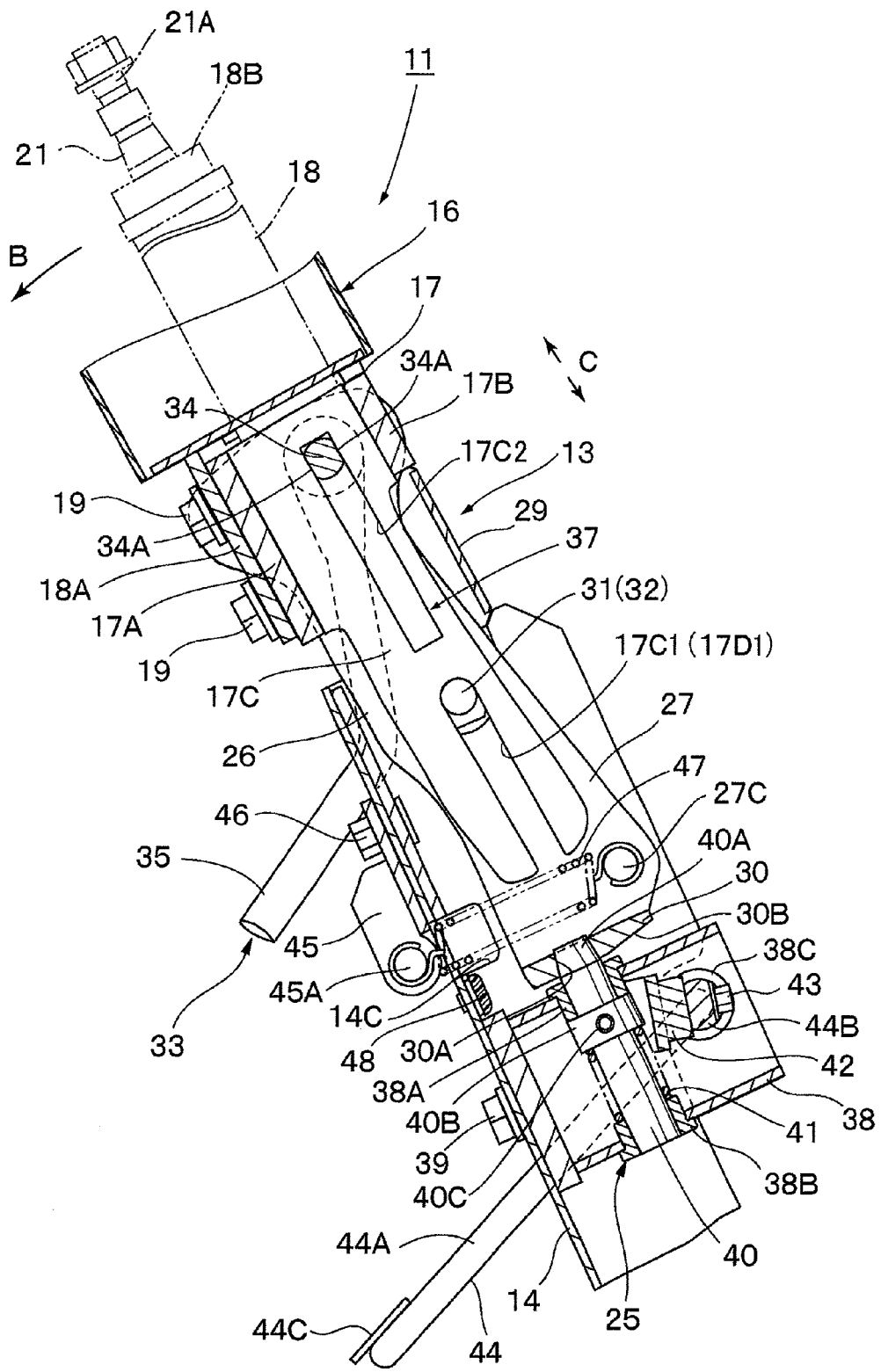
FIG. 6 is a sectional view illustrating the tilt-up mechanism, a tilt angle adjusting mechanism, a column length adjusting mechanism and the like in an enlarged manner from a direction of arrows VI-VI in FIG. 4 in a state where the steering device is brought to a drive position by the tilt-up mechanism.
Figure 7:
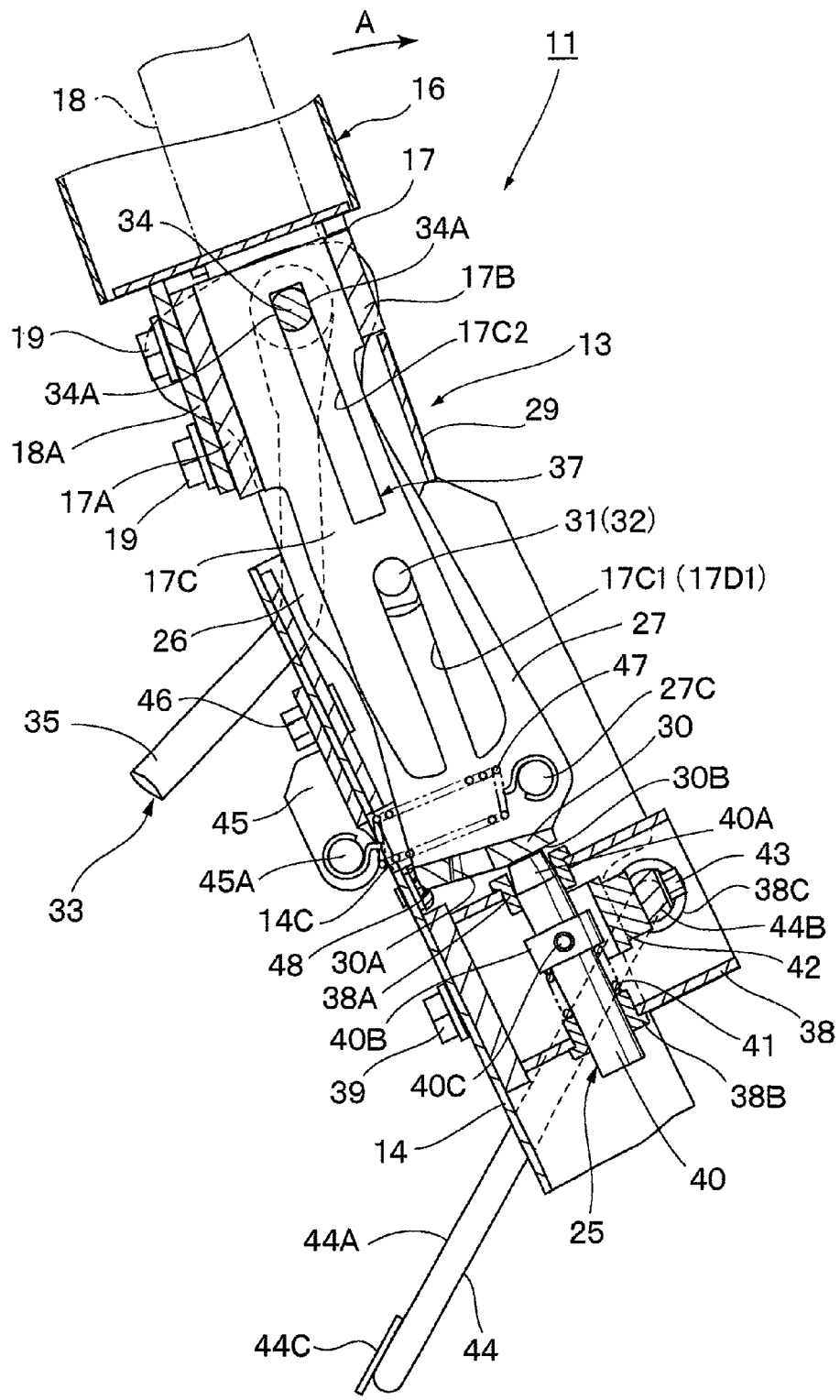
FIG. 7 is a sectional view illustrating the tilt-up mechanism, the tilt angle adjusting mechanism, the column length adjusting mechanism and the like when seen from a position similar to that in FIG. 6 in a state where the steering device is brought to a tilt-up position by the tilt-up mechanism.

The left side plate portion 17C and the right side plate portion 17D oppose each other in the left-right direction sandwiching the space portion 17E and are formed as leg portions extending longer in the upper-lower direction than the front plate portion 17A and the rear plate portion 17B. In the left side plate portion 17C and the right side plate portion 17D, U-shaped slits 17C1 and 17D1 extending in the upper-lower direction and having open lower ends are formed. Moreover, in the left side plate portion 17C, an I-shaped slit 17C2 is formed away and above the U-shaped slit 17C1. As illustrated in FIGS. 6 and 7, this I-shaped slit 17C2 is arranged having the same slit width on substantially the same straight line as the U-shaped slit 17C1.

As illustrated in FIG. 9, into the I-shaped slit 17C2 of the left side plate portion 17C, a connecting bolt 34 which will be described later is inserted. Into the U-shaped slits 17C1 and 17D1 of each of the side plate portions 17C and 17D, the support shafts 31 and 32 which will be described later are inserted, respectively. The U-shaped slit 17C1 and the I-shaped slit 17C2 formed in the left side plate portion 17C of the column frame 17 and the U-shaped slit 17D1 formed in the right side plate portion 17D constitute a length adjusting portion of the column length adjusting mechanism 37 which will be described later.

Figure 5:
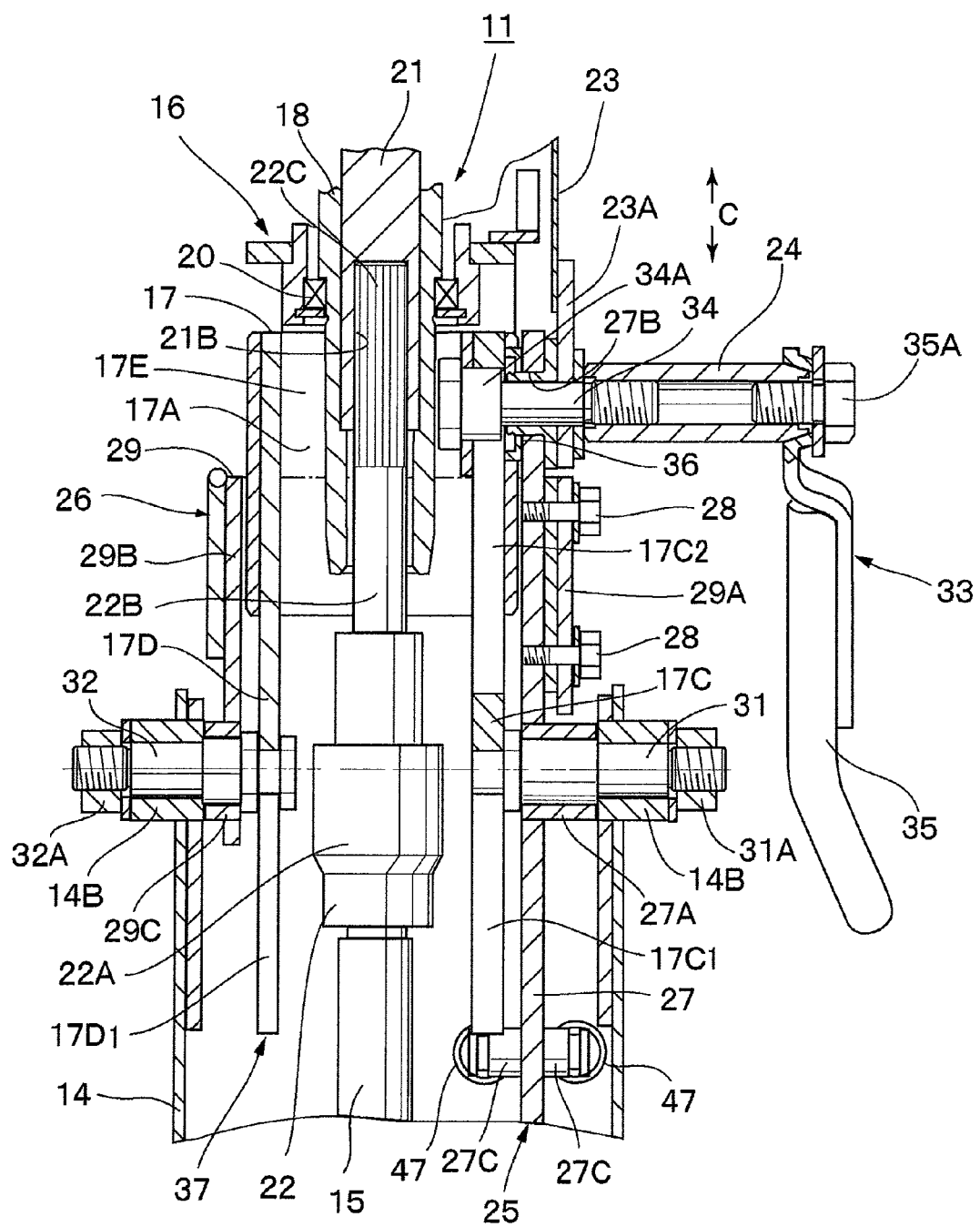
FIG. 5 is a sectional view illustrating a tilt lever, a tilt-up member and the like of the steering device in an enlarged manner from a direction of arrows V-V in FIG. 3.

On the lower end side of the mounting post 18, a fixing plate 18A is provided by being suspended downward, and this fixing plate 18A is fixed to the front plate portion 17A of the column frame 17 by using a plurality of bolts 19. As a result, the mounting post 18 is integrated in a state mounted on the upper side of the column frame 17. As illustrated in FIG. 5, inside the mounting post 18, the upper shaft 21 is rotatably mounted through a bearing 20. On the other hand, on the upper end side of the mounting post 18, a cylindrical cap 18B for sealing a space between that and the upper shaft 21 which will be described later is detachably provided.

The upper shaft 21 for steering constitutes a part of the upper column 16. This upper shaft 21 is inserted into the space portion 17E of the column frame 17 from below and arranged penetrating the mounting post 18 in the upper-lower direction. The upper end side of the upper shaft 21 becomes a projecting portion 21A projecting upward from the mounting post 18, and the steering wheel 12 is attached to this projecting portion 21A (See FIG. 2). As illustrated in FIG. 5, on the lower end side of the upper shaft 21, a fitting bore 21B is formed in the axial direction, and into this fitting bore 21B, a shaft portion 22B of the joint member 22 which will be described later is fitted in a detent state by a serration 22C.

The joint member 22 is provided between the lower shaft 15 and the upper shaft 21. This joint member 22 includes a joint portion 22A attached on the upper end side of the lower shaft 15 and a shaft portion 22B connected to the joint portion 22A capable of rocking in the front-rear direction and the left-right direction and extending upward. The joint member 22 is constituted as a universal joint which transmits rotation of the shaft portion 22B to the lower shaft 15 through the joint portion 22A.

In the joint member 22, a serration 22C having a predetermined length is formed on the upper side of the shaft portion 22B. This serration 22C regulates relative rotation between the fitting bore 2113 of the upper shaft 21 and the shaft portion 22B of the joint member 22 and allows relative displacement in the axial direction. When the height of the upper column 16 with respect to the lower column 14 is adjusted in the height direction C by the column length adjusting mechanism 37 which will be described later, the serration 22C can compensate for the relative displacement of the upper shaft 21 in the axial direction with respect to the shaft portion 22B.

The lever supporter 23 is attached to the left side plate portion 17C of the column frame 17. This lever supporter 23 has a support plate 23A having a substantially rectangular shape suspended downward, and a cylindrical nut 24 is attached to the support plate 23A through the connecting bolt 34 which will be described later. The cylindrical nut 24 constitutes the connecting member together with the connecting bolt 34, and a tilt lever 35 which will be described later is fixed to the distal end side of the cylindrical nut 24. When the operator rotates and operates the tilt lever 35, the cylindrical nut 24 is relatively rotated with respect to the connecting bolt 34, and the cylindrical nut 24 and the connecting bolt 34 are connected or disconnected.

Designated at 25 is a tilt-up mechanism employed in this embodiment, and the tilt-up mechanism 25 is provided extending in the upper-lower direction between the lower column 14 and the upper column 16 and includes the tilt-up member 26 for tilting up the upper column 16 with respect to the lower column 14, a pin holder 38, a lock pin 40, a lock spring 41, a pin operating member 42, a pedal 44, and the tilt-up spring 47, which will be described later.

The tilt-up member 26 includes a plane plate-shaped rocking plate 27 extending in the upper-lower direction between the side plate portion 17C of the column frame 17 and the lever supporter 23 and having the lower end side inserted into the lower column 14, a bent plate 29 fixed to the rocking plate 27 with a plurality of bolts 28, and a cam plate 30 provided on the lower end side of the rocking plate 27 and opposed to the pin holder 38 and a lock pin 40 in the upper-lower direction in the lower column 14, which will be described later.

The rocking plate 27 extending in the upper-lower direction has a pivot portion 27A provided on an intermediate portion in the length direction, and the pivot portion 27A is rotatably attached to the axial support portion 14B of the lower column 14 through the support shaft 31 which will be described later. On the other hand, in the rocking plate 27, an elongate hole portion 27B for tilt angle adjustment is drilled at a position on the upper side than the pivot portion 27A, and the elongate hole portion 27B is formed as a long hole extending in an arc shape in the front-rear direction of the vehicle around the pivot portion 27A as the center.

The upper side (the peripheral portion of the elongate hole portion 27B) of the rocking plate 27 is kept in a state fixed to the column frame 17 of the upper column 16 through the connecting bolt 34 until the connected state between the cylindrical nut 24 and the connecting bolt 34 is released by the tilt lever 35 which will be described later. As a result, the entire tilt-up member 26 is brought into a state fixed to the upper column 16. On the other hand, on the lower side of the rocking plate 27, a pair of projecting portions 27C are provided projecting in the left-right direction on the front surface side and the back surface side thereof, and each of the projecting portions 27C hooks each of the tilt-up springs 47 which will be described later.

As illustrated in FIGS. 8 and 9, the bent plate 29 has a left bending portion 29A and a right bending portion 29B. The left bending portion 29A is fixed between the pivot portion 27A of the rocking plate 27 and the elongate hole portion 27B by each of the bolts 28. On the right bending portion 29B, another pivot portion 29C is provided at a position opposite in the left-right direction to the pivot portion 27A of the rocking plate 27. This pivot portion 29C is rotatably attached to the axial support portion 14B of the lower column 14 through the support shaft 32 which will be described later.

The tilt-up member 26 is arranged so as to sandwich the side plate portions 17C and 17D of the column frame 17 from the left-right direction between the rocking plate 27 and the bending portion 29B of the bent plate 29. In this state, the pivot portions 27A and 29C of the tilt-up member 26 are connected to the U-shaped slits 17C1 and 17D1 of the column frame 17 and each of the axial support portions 14B of the lower column 14 by the support shafts 31 and 32 (See FIG. 5).

Here, the support shafts 31 and 32 constitute a rotation fulcrum of the tilt-up mechanism 25 and are opposed to each other in the left-right direction and arranged at the same height positions. The support shaft 31 is inserted into the U-shaped slit 17C1 of the column frame 17, the pivot portion 27A of the rocking plate 27, and the left axial support portion 14B of the lower column 14. A nut 31A is screwed into the distal end side of the support shaft 31 protruding from this axial support portion 14B. On the other hand, the support shaft 32 is inserted into the U-shaped slit 17D1 of the column frame 17, the pivot portion 29C of the bent plate 29, and the right axial support portion 14B of the lower column 14. A nut 32A is screwed into the distal end side of the support shaft 32 protruding from this axial support portion 14B.

As illustrated in FIGS. 6 and 7, an engage hole 30A having a tapered shape is drilled in the cam plate 30 provided on the lower end side of the rocking plate 27, and a tapered portion 40A of the lock pin 40 which will be described later is engaged with this engage hole 30A capable of advancing/retreating. Moreover, an inclined surface 30B is formed on the lower surface side of the cam plate 30. This inclined surface 30B is to smoothly guide a distal end surface of the lock pin 40 which will be described later from a disengaged position illustrated in FIG. 7 to an engaged position illustrated in FIG. 6.

Designated at 33 is a tilt angle adjusting mechanism employed in this embodiment, and the tilt angle adjusting mechanism 33 includes the elongate hole portion 27B for tilt angle adjustment drilled in the rocking plate 27, the connecting bolt 34 which connects the column frame 17 of the upper column 16 to the lever supporter 23 with respect to this elongate hole portion 27B and holds an adjusted position of the tilt angle, and the tilt lever 35 as a manual lever which releases the connected state of the connecting bolt 34 by means of a rotating operation from the outside. The cylindrical nut 24 and the connecting bolt 34 are detachably provided on the lever supporter 23 of the upper column 16 and constitute a connecting member of the tilt angle adjusting mechanism 33.

The tilt lever 35 is fixed to the distal end side of the cylindrical nut 24 by using a bolt 35A and rotates the cylindrical nut 24 in forward and backward directions with respect to the connecting bolt 34. As a result, the cylindrical nut 24 is selectively rotated in a tightening direction and a loosening direction with respect to the connecting bolt 34.

As illustrated in FIG. 8, the connecting bolt 34 has a pair of chamfered portions 34A formed on the base end side, and each of the chamfered portions 34A is engaged with the I-shaped slit 17C2 of the column frame 17. As a result, the connecting bolt 34 is attached to the side plate portion 17C of the column frame 17 in a detent state. The distal end side of the connecting bolt 34 is inserted into the elongate hole portion 27B of the rocking plate 27 through a washer 36 and screwed and mounted to the cylindrical nut 24 from the back surface side of the support plate 23A.

When the operator rotates the tilt lever 35 downward, the cylindrical nut 24 is rotated in the tightening direction with respect to the connecting bolt 34. That is, the connecting bolt 34 sandwiches the periphery of the elongate hole portion 27B of the rocking plate 27 between the side plate portion 17C of the column frame 17 and the support plate 23A. As a result, the column frame 17 of the upper column 16 is connected to the rocking plate 27 of the tilt-up member 26.

On the other hand, when the operator rotates the tilt lever 35 upward, the cylindrical nut 24 is rotated in the loosening direction with respect to the connecting bolt 34, and the connected state with the rocking plate 27 by the connecting bolt 34 and the cylindrical nut 24 is released. Thus, the column frame 17 of the upper column 16 becomes capable of relative movement together with the lever supporter 23 and the connecting bolt 34 along the elongate hole portion 27B of the rocking plate 27, and the tilt angle of the upper column 16 with respect to the lower column 14 can be adjusted in the front-rear direction. At this time, the upper column 16 is tilted around the support shafts 31 and 32 with respect to the lower column 14, and the adjustment of the tilt angle is made within an arc range of the elongate hole portion 27B.

Designated at 37 is the column length adjusting mechanism employed in this embodiment, and the column length adjusting mechanism 37 includes the U-shaped slit 17C1 and the I-shaped slit 17C2 as length adjusting portions formed in the left side plate portion 17C of the column frame 17, the U-shaped slit 17D1 as a length adjusting portion formed similarly in the right side plate portion 17D, the cylindrical nut 24, the connecting bolt 34, and the tilt lever 35. The column length adjusting mechanism 37 adjusts the height of the upper column 16 with respect to the lower column 14 in the height direction C in FIGS. 5 and 6 in a state where the tightened state of the cylindrical nut 24 and the connecting bolt 34 is released by the tilt lever 35. That is, the height position of the upper column 16 with respect to the lower column 14 is adjusted by moving the connecting bolt 34 together with the upper column 16 in the upper-lower direction along the length direction of the U-shaped slits 17C1 and 17D1 and the I-shaped slit 17C2.

As illustrated in FIG. 10, the pin holder 38 is fixed to the lower column 14 through a plurality of bolts 39. This pin holder 38 is formed having a hollow box shape, and cylindrical pin guides 38A and 38B are provided on the upper and lower surfaces thereof (See FIGS. 6 and 7). The lock pin 40 which will be described later, located between the pin guides 38A and 38B, is held by the pin holder 38 capable of sliding displacement. Moreover, on the pin holder 38, a mounting tube portion 38C is provided at a position on the rear side of the lower column 14 of the pin guides 38A and 38B, and a bar mounting portion 44B of the pedal 44 which will be described later is fitted in this mounting tube portion 38C.

Figure 4:
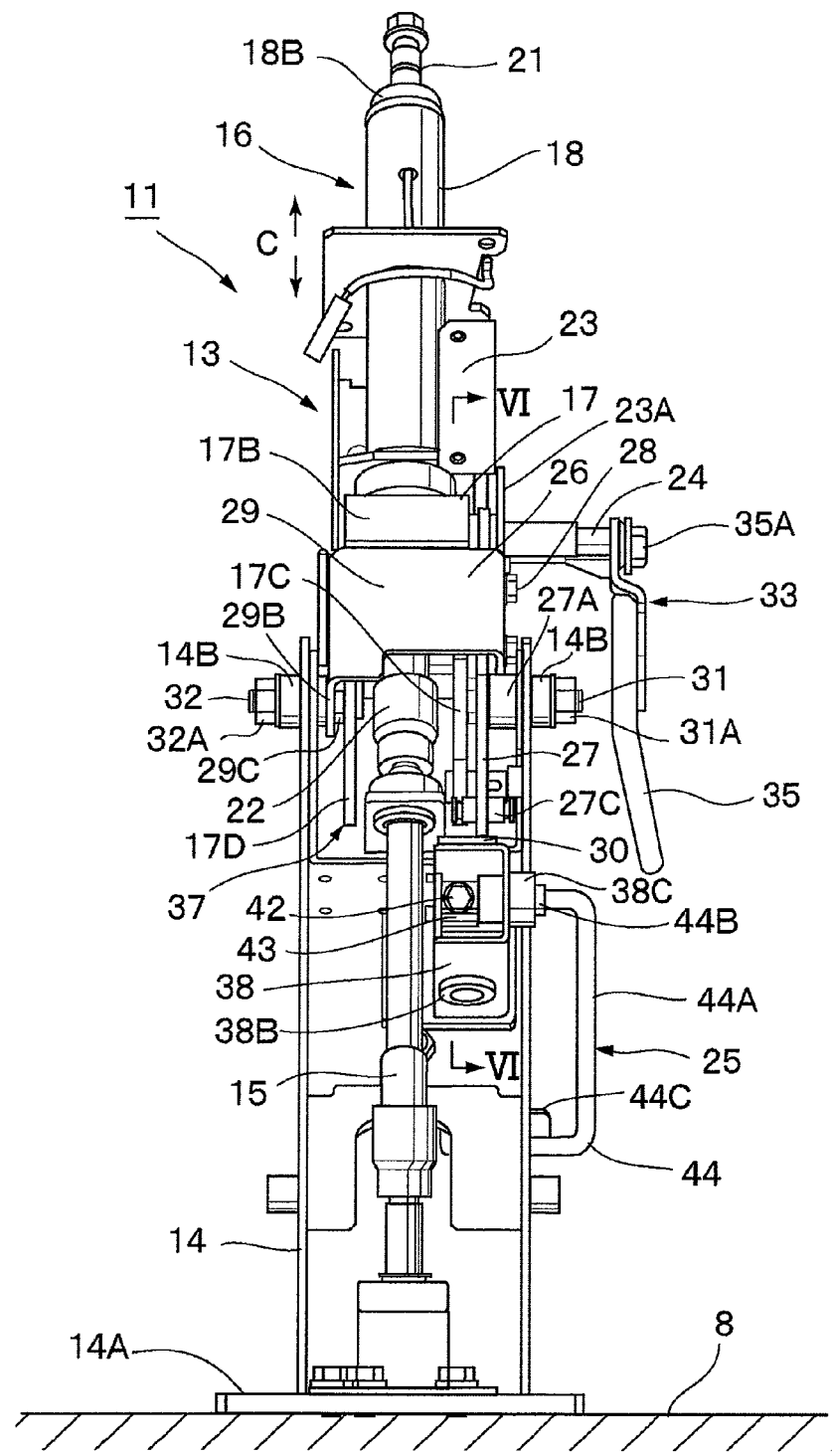
FIG. 4 is a left side view of the steering device illustrated in FIG. 3.

Here, as illustrated in FIG. 4, the pin holder 38 is located on the lower side of the rocking plate 27 and is arranged closer to one side (the left side when seen from the rear side of the vehicle, for example) in the both left and right sides of the lower column 14. That is, the pin holder 38 is fixed and provided in the lower column 14 at a position outside in the radial direction of the lower shaft 15 in order to avoid contact and interference with the lower shaft 15 accommodated in the lower column 14.

The taper-shaped lock pin 40 constitutes a part of the tilt-up mechanism 25. As illustrated in FIGS. 6 and 7, this lock pin 40 is provided slideably through the pin guides 38A and 38B in the pin holder 38. One side in the length direction of the lock pin 40 is formed as a tapered portion 40A, and this tapered portion 40A side is supported slideably by the pin guide 38A. The other side in the length direction of the lock pin 40 is formed as a parallel pin having the equal outer diameter dimension and is supported slideably by the pin guide 38B.

On an intermediate portion in the length direction of the lock pin 40, a ring-shaped spring receiving portion 40B formed having a diameter larger than the inner diameter of each of the pin guides 38A and 38B and a pair of protrusions 40C protruding outward in the radial direction from the outer peripheral surface of the spring receiving portion 40B are provided. The pair of protrusions 40C are arranged at positions opposite to each other in the radial direction of the spring receiving portion 40B. Each of the grip portions 42A of the pin operating member 42 which will be described later is detachably engaged with the pair of protrusions 40C so as to sandwich the protrusions from the upper-lower direction.

The lock spring 41 as a biasing member is located in the pin holder 38 and provided on the outer periphery side of the lock pin 40, and this lock spring 41 is disposed between the spring receiving portion 40B of the lock pin 40 and the pin guide 38B. The lock spring 41 is constituted as a compression spring and biases the tapered portion 40A of the lock pin 40 all the time in a direction protruding outward from the pin guide 38A. As a result, as illustrated in FIGS. 6 and 7, the tapered portion 40A of the lock pin 40 is engaged with the engage hole 30A of the cam plate 30 capable of advancing/retreating.

That is, as illustrated in FIG. 6, while the tapered portion 40A of the lock pin 40 is engaged with the engage hole 30A of the cam plate 30, the rocking plate 27 of the tilt-up member 26 is locked by the lower column 14 through the pin holder 38 and the lock pin 40. As a result, the upper column 16 is held in a state positioned at a drive position indicated by a solid line in FIG. 3 with respect to the lower column 14. On the other hand, as illustrated in FIG. 7, when the tapered portion 40A of the lock pin 40 is removed from the engage hole 30A of the cam plate 30, the rocking plate 27 of the tilt-up member 26 is rotated in the arrow A direction by the tilt-up spring 47 which will be described later. As a result, the upper column 16 is tilted up to a tilt-up position indicated by a two-dot chain line in FIG. 3 with respect to the lower column 14.

The pin operating member 42 is to operate the lock pin 40 against the lock spring 41. This pin operating member 42 has the pair of grip portions 42A formed in the left-right direction away from the outer diameter of the spring receiving portion 40B of the lock pin 40. Each of the grip portions 42A grips each of the protrusions 40C of the lock pin 40 so as to sandwich them from above and below. On the other hand, the pin operating member 42 is connected and fixed to the bar mounting portions 44B of the pedal 44 which will be described later by using a bolt 43 in a state inserted into the pin holder 38 from the rear. As a result, the pin operating member 42 is assembled so as to rotate upward and downward around the position of the mounting tube portion 38C in the pin holder 38.

Designated at 44 is a pedal for stepping on and operating the tilt-up mechanism 25. As illustrated in FIG. 10, this pedal 44 includes a pedal bar 44A formed by being bent in the U-shape, the bar mounting portion 44B provided on the base end side of the pedal bar 44A and rotatably inserted into the mounting tube portion 38C of the pin holder 38, and a foot operated plate 44C provided on the distal end side of the pedal bar 44A and stepped on and operated by the operator.

Figure 2:
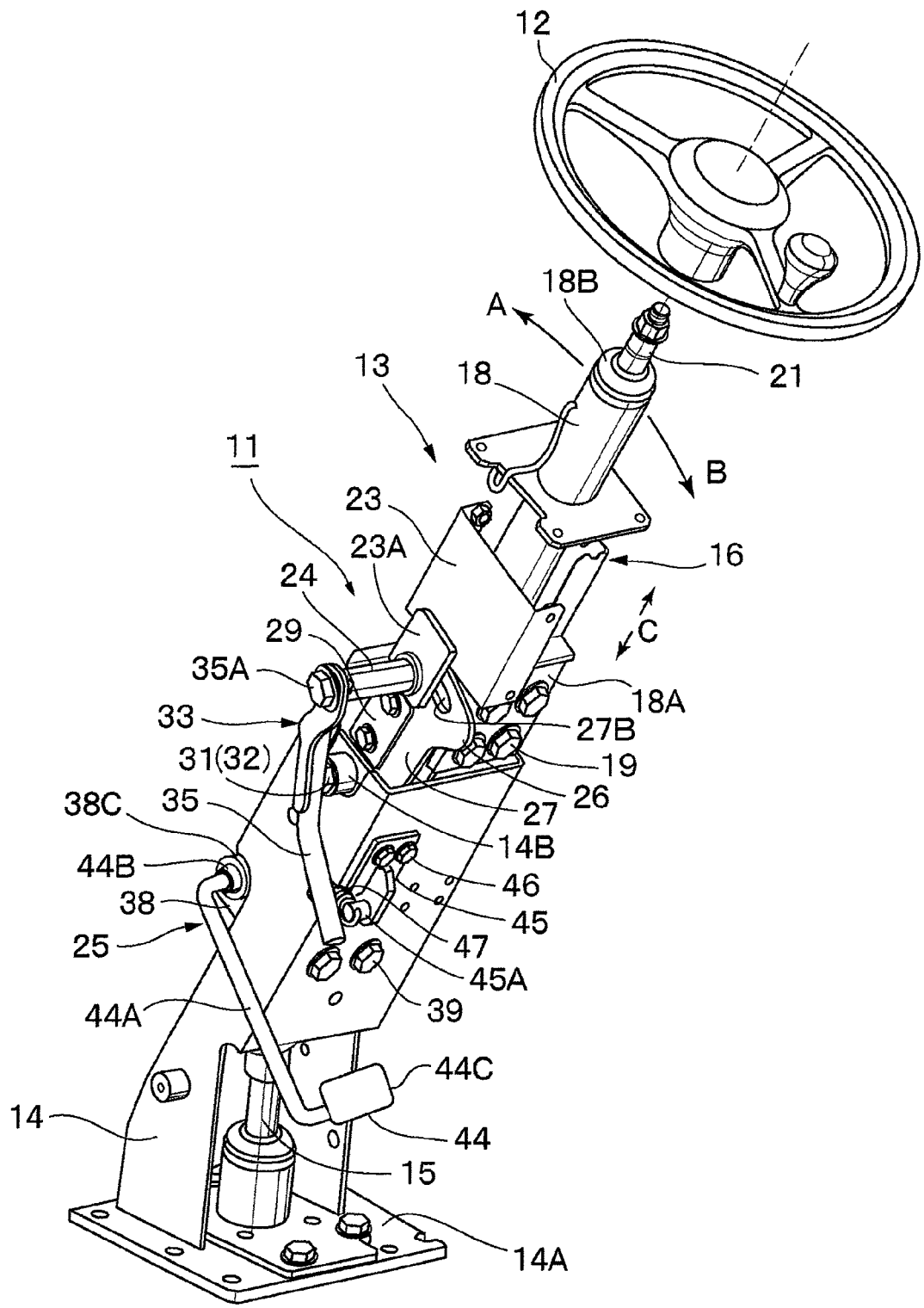
FIG. 2 is a perspective view illustrating the steering device in FIG. 1 in an enlarged manner.
Figure 3:
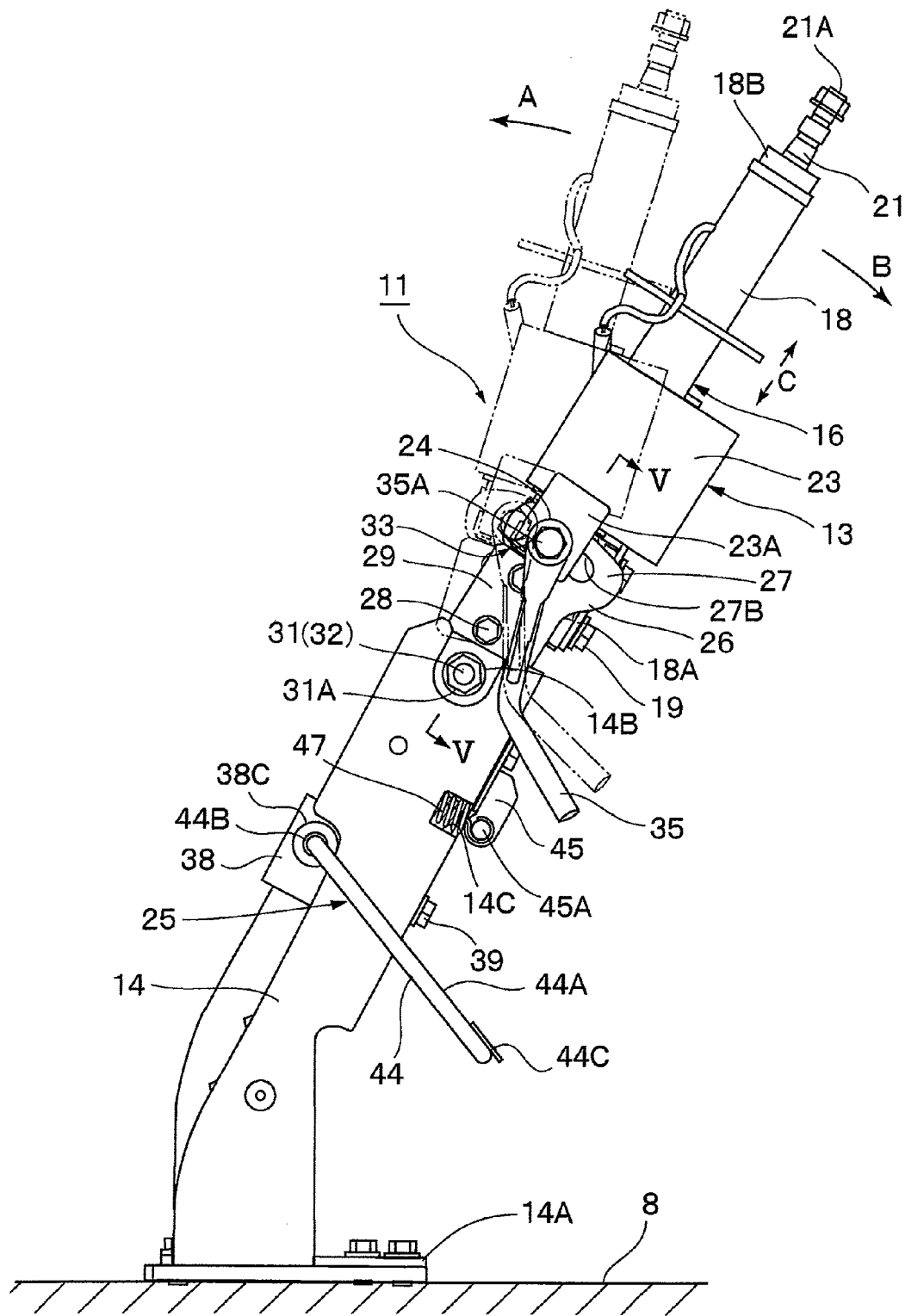
FIG. 3 is a front view of the steering device illustrated in FIG. 2.

As illustrated in FIGS. 2 and 3, the pedal bar 44A of the pedal 44 extends so as to cross diagonally downward the left side of the lower column 14 from the position of the pin holder 38. The foot operated plate 44C is arranged at a position in the vicinity of the foot of the operator seated on the operator's seat 9. When the operator steps on and operates the pedal 44, the pin operating member 42 is rotated around the position of the mounting tube portion 38C in the pin holder 38. As a result, the pin operating member 42 presses each protrusion 40C of the lock pin 40 downward by each grip portion 42A, and the lock pin 40 is moved to a disengaged position illustrated in FIG. 7 from an engaged position illustrated in FIG. 6 against the lock spring 41. As a result, the engaged state of the lock pin 40 with the engage hole 30A of the cam plate 30 is disengaged.

On the other hand, when the stepping-on operation on the pedal 44 is released, the lock pin 40 is biased upward by the lock spring 41 along the pin guides 38A and 38B. Thus, when the operator performs an operation of pulling the steering wheel 12 to the operator's seat 9 side, the upper column 16 and the tilt-up member 26 are rotated together around the positions of the support shafts 31 and 32 to the drive position direction B. As a result, as illustrated in FIG. 6, the tapered portion 40A of the lock pin 40 is engaged with the engage hole 30A of the cam plate 30. As a result, the upper column 16 is positioned at the drive position tilted to the front side with respect to the lower column 14.

A spring receiving member 45 is detachably fixed to the front surface side of the lower column 14 by a bolt 46. The spring receiving member 45 has pin portions 45A extending in the left-right direction as illustrated in FIG. 10, and these pin portions 45A are arranged at positions corresponding to the notched hole 14C of the lower column 14. Each of the pin portions 45A of the spring receiving member 45 hooks the tilt-up spring 47 which will be described later.

The two tilt-up springs 47 as spring members are used as tension springs and constitute a part of the tilt-up mechanism 25. As illustrated in FIGS. 6, 7, and 10, each of the tilt-up springs 47 has one side in the length direction hooked by each of the pin portions 45A of the spring receiving member 45, while the other side is hooked by each projecting portion 27C of the rocking plate 27. The tilt-up spring 47 biases the rocking plate 27 of the tilt-up member 26 capable of rocking around the support shafts 31 and 32 toward the front surface side of the lower column (that is, the tilt-up position direction A).

Here, when the lock pin 40 is moved from the engaged position illustrated in FIG. 6 to the disengaged position illustrated in FIG. 7 and the engaged state of the lock pin 40 with the engage hole 30A of the cam plate 30 is disengaged, the rocking plate 27 of the tilt-up member 26 is made to rock in the arrow A direction by the tilt-up spring 47. As a result, the upper column 16 is tilted up to the tilt-up position indicated by the two-dot chain line in FIG. 3 with respect to the lower column 14.

As illustrated in FIGS. 6 and 7, two cushion members 48 are attached to the front surface side of the lower column 14. The cushion members 48 are arranged at positions opposite to the cam plate 30 of the tilt-up member 26 in the front-rear direction in order to buffer collision of the cam plate 30 against the front surface side of the lower column 14. That is, when the upper column 16 is to be tilted up to the tilt-up position, the cushion members 48 are brought into contact with the cam plate 30 of the tilt-up member 26 and elastically deformed. As a result, the rocking plate 27 has its movement in the tilt-up position direction A regulated.

The steering device 11 of the wheel loader 1 according to this embodiment has a configuration as described above, and its operation will be described below.

When the operator of the wheel loader 1 is to get on the operator's seat 9 of the vehicle body 2, the steering column 13 is tilted up at a tilt-up position (position indicated by the two-dot chain line in FIG. 3) together with the steering wheel 12. Thus, a relatively large space can be formed from the steering wheel 12 on the front side of the operator's seat 9, and the steering wheel 12 is prevented from being in the way on the front side of the operator's seat 9 for the operator who is getting on the operator's seat 9.

Subsequently, the operator seated on the operator's seat 9 performs an operation of pulling the steering wheel 12 to the operator side. As a result, the steering column 13 can be moved in the drive position direction B closer to the operator's seat 9. That is, the upper column 16 can be manually tilted from the tilt-up position indicated by the two-dot chain line in FIG. 3 to the drive position indicated by the solid line with respect to the lower column 14.

In this state, when the operator adjusts the tilt angle and the column length of the steering column 13 in accordance with his/her own body type and preference, the operator operates the tilt lever 35 so as to rotate upward. As a result, the cylindrical nut 24 of the tilt angle adjusting mechanism 33 is rotated in the loosening direction with respect to the connecting bolt 34, and the connected state of the connecting bolt 34 and the cylindrical nut 24 with respect to the rocking plate 27 is released.

Then, the operator grips the steering wheel 12 and moves it in the front-rear direction, for example, whereby the column frame 17 of the upper column 16 relatively moves together with the lever supporter 23 and the connecting bolt 34 along the elongate hole portion 27B of the rocking plate 27. As a result, the tilt angle of the upper column 16 with respect to the lower column 14 can be variably adjusted so as to be finely adjusted in the front-rear direction of the vehicle, that is, in the tilt-up position direction A and the drive position direction B in FIGS. 2 and 3.

At this time, the tilt-up member 26 composed of the rocking plate 27, the bent plate 29, and the cam plate 30 is fixed to the lower column 14 side through the lock pin 40. Thus, the upper column 16 can be relatively moved within the arc range of the elongate hole portion 27B with respect to the rocking plate 27 of the tilt-up member 26 by the manual operation of the operator and can be tilted in the front-rear direction around the support shafts 31 and 32 with respect to the lower column 14. That is, the adjustment of the tilt angle is made within the arc range of the elongate hole portion 27B.

In a case where the column length is to be adjusted in this state, the operator grips the steering wheel 12 and moves it in the upper-lower direction so as to manually operate the column length adjusting mechanism 37. That is, as described above, in the state where the connected state between the cylindrical nut 24 and the connecting bolt 34 is released by the tilt lever 35, the upper column 16 is moved in the upper-lower direction together with the steering wheel 12. As a result, the height position of the upper column 16 with respect to the lower column 14 can be set in the upper-lower direction along the length directions of the U-shaped slits 17C1 and 17D1 and the I-shaped slit 17C2 (that is, the height direction C in FIGS. 5 and 6) so as to adjust the column length as appropriate.

In a case where the column length is to be adjusted as above, the joint member 22 provided between the lower shaft 15 and the upper shaft 21 has the shaft portion 22B connected with the fitting bore 21B of the upper shaft 21 through the serration 22C. Thus, in a case where the height position of the upper column 16 with respect to the lower column 14 is to be adjusted by the column length adjusting mechanism 37, relative displacement of the upper shaft 21 in the axial direction with respect to the shaft portion 22B of the joint member 22 can be compensated for by the serration 22C.

Subsequently, when the adjusting work as above is completed, the operator rotates the tilt lever 35 downward so that the cylindrical nut 24 is rotated together with the tilt lever 35 in the tightening direction of the connecting bolt 34. As a result, the rocking plate 27 of the tilt-up member 26 is brought into the connected state again together with the support plate 23A between the connecting bolt 34 and the cylindrical nut 24. Thus, the upper column 16 is held at the adjusted position where the tilt angle and the column length are adjusted with respect to the lower column 14, and this state is fixed. It should be noted that the tilt angle adjustment and the column length adjustment of the steering column 13 may be selectively made for either one of or both of them at the judgment by the operator.

In a case where the operator drives the wheel loader 1 and runs on the road, when the operator steers and operates the steering wheel 12, the operation force at this time is transmitted from the upper shaft 21 to the lower shaft 15 through the joint member 22. At this time, the lower shaft 15 transmits the steering operation of the steering wheel 12 to a steering cylinder (not shown) composed of a hydraulic cylinder. As a result, in the wheel loader 1, the front vehicle body 4 is rocked in the left-right direction with respect to the rear vehicle body 3, and its running direction is steered.

On the other hand, when the work by the working mechanism 7 of the wheel loader 1 is finished and the operator is to get off the operator's seat 9, since the steering wheel 12 is located in the vicinity on the lap of the operator seated on the operator's seat 9, when the operator is to stand up and to leave the operator's seat 9, the steering wheel 12 might be in the way.

Thus, when the operator steps on and operates the pedal 44 of the tilt-up mechanism 25, the engaged state of the lock pin 40 with respect to the cam plate 30 of the tilt-up member 26 is disengaged, and the rocking plate 27 of the tilt-up member 26 is moved in the tilt-up position direction A around the pivot portions 27A and 29C by the tilt-up spring 47. Thus, the upper column 16 is tilted around each axial support portion 14B of the lower column 14 together with the tilt-up member 26 and is automatically tilted up from the drive position indicated by the solid line in FIG. 3 to the tilt-up position indicated by the two-dot chain line.

In this case, in the pin holder 38 provided on the lower column 14 side, the pin operating member 42 is rotated around the position of the mounting tube portion 38C by the stepping-on operation on the pedal 44. As a result, the lock pin 40 provided on the pin holder 38 is slid and displaced downward by each grip portion 42A of the pin operating member 42 against the lock spring 41 with respect to the pin guides 38A and 38B.

That is, by means of movement of the lock pin 40 from the engaged position illustrated in FIG. 6 to the disengaged position illustrated in FIG. 7 against the lock spring 41, the engaged state of the lock pin 40 with the engage hole 30A of the cam plate 30 is disengaged. Thus, the rocking plate 27 of the tilt-up member 26 is biased in the arrow A direction in FIG. 7 around the support shafts 31 and 32 by the tilt-up spring 47, and the upper column 16 is tilted up to the tilt-up position indicated by the two-dot chain line in FIG. 3 with respect to the lower column 14.

As described above, by tilting up the upper column 16 in the arrow A direction with respect to the lower column 14, the operator can stand up and leave the operator's seat 9 without being obstructed by the steering wheel 12. On the other hand, when the stepping-on operation on the pedal 44 is released, the lock pin 40 is biased upward by the lock spring 41 along the pin guides 38A and 38B. At this time, the distal end surface of the lock pin 40 is brought into contact with the inclined surface 30B formed on the lower surface side of the cam plate 30.

Subsequently, in a case where the operator is to get on the operator's seat 9 again, since the steering column 13 has been tilted up together with the steering wheel 12 to the tilt-up position, the operator can sit on the operator's seat 9 with allowance without being obstructed by the steering wheel 12. In this state, the operator can rotate the upper column 16 together with the tilt-up member 26 in the drive position direction B around the positions of the support shafts 31 and 32 by performing an operation of pulling the steering wheel 12 to the near side to the operator's seat 9 side.

At this time, the inclined surface 30B of the cam plate 30 can smoothly guide the distal end surface of the lock pin 40 from the disengaged position illustrated in FIG. 7 to the engaged position illustrated in FIG. 6, and the tapered portion 40A of the lock pin 40 can be engaged with the engage hole 30A of the cam plate 30. As a result, the upper column 16 of the steering column 13 can be returned from the tilt-up position indicated by the two-dot chain line in FIG. 3 to the drive position indicated by the solid line, and the tilt-up member 26 can be locked at the engaged position by the lock pin 40.

Thus, according to this embodiment, the tilt-up mechanism 25 is composed of the tilt-up member 26 extending in the upper-lower direction between the lower column 14 and the upper column 16 and having the intermediate portion in the length direction rotatably attached to the axial support portion 14B of the lower column 14 and the upper side fixed to the column frame 17 of the upper column 16 through the connecting bolt 34, the tapered lock pin 40 provided on the lower column 14 side capable of displacement and engaged with the cam plate 30 of the tilt-up member 26 all the time and positioning the upper column 16 at the drive position, and the tilt-up spring 47 provided between the projecting portion 27C of the tilt-up member 26 and the spring receiving member 45 on the lower column 14 side and tilting up the upper column 16 together with the tilt-up member 26 when the engagement of the lock pin 40 with respect to the engage hole 30A of the cam plate 30 is disengaged.

As a result, while the lock pin 40 is engaged with the tilt-up member 26 rotatably attached to the axial support portion 14B of the lower column 14, the upper column 16 can be positioned at the drive position close to the operator's seat, and the operator can easily perform the steering operation by means of the steering wheel 12 in this state. In this case, the lock pin 40 can be biased toward the cam plate 30 side of the tilt-up member 26 by the lock spring 41, and the upper column 16 can be kept locked at the drive position by regulating the tilt-up operation of the tilt-up member 26 by the lock pin 40.

On the other hand, when the steering wheel 12 is in the way when the operator stands up and leaves the operator's seat 9, the engagement of the lock pin 40 with respect to the cam plate 30 of the tilt-up member 26 is disengaged. As a result, the upper column 16 can be tilted up together with the tilt-up member 26 by the spring force of the tilt-up spring 47, and the steering wheel 12 can be moved to the tilt-up position away from the operator's seat 9. In this case, by forming the tapered portion 40A at an engagement portion of the lock pin 40, the engagement/disengagement of the lock pin 40 with respect to the engage hole 30A of the tilt-up member 26 can be performed smoothly, and operability when the upper column 16 is tilted to the drive position and the tilt-up position can be improved.

Therefore, when the operator seated on the operator's seat 9 wants to move the steering wheel 12 to the tilt-up position, only by performing the stepping-on operation on the pedal 44 of the tilt-up mechanism 25, the upper column 16 of the steering column 13 can be easily tilted up together with the steering wheel 12 to the tilt-up position away from the operator's seat 9, and workability during getting on/off can be drastically improved. As described above, in a state where the steering wheel 12 is tilted up, the lock pin 40 can be held capable of displacement to the position opposite to the cam plate 30 of the tilt-up member 26 in the upper-lower direction by the pin holder 38 provided in the lower column 14. As a result, the lock pin 40 can be biased toward the cam plate 30 of the tilt-up member 26 all the time by the lock spring 41 provided between the pin holder 38 and the lock pin 40.

On the other hand, according to this embodiment, the tilt-up mechanism 25 for tilting up the upper column 16 of the steering column 13 from the drive position to the tilt-up position is configured to be independent from the tilt angle adjusting mechanism 33 and the column length adjusting mechanism 37. Therefore, by performing the tilt angle adjustment of the steering column 13 by the tilt angle adjusting mechanism 33 and by performing the column length adjustment by the column length adjusting mechanism 37 once, the respective adjusted positions can be maintained after that.

As a result, the operator who is to get on/off the operator's seat 9 can tilt up the steering column 13 together with the steering wheel 12 in the direction away from the operator's seat 9 only by operating the pedal 44 of the tilt-up mechanism 25. At this time, the tilt angle and the column length are held at the positions adjusted in advance. Thus, when the same operator gets on the operator's seat 9 next time, there is no need to perform the adjusting work of the tilt angle and the column length again, and workability during getting on/off can be drastically improved.

On the other hand, in a case where an operator different from the operator in the previous work is to get on the operator's seat 9, it is only necessary for this operator to rotate the tilt lever 35 upward in a state where the steering column 13 is returned from the tilt-up position to the drive position together with the steering wheel 12. As a result, the connected state with respect to the rocking plate 27 of the tilt-up member 26 by the support plate 23A, the cylindrical nut 24, and the connecting bolt 34 can be released, and the locking (maintained state) of the tilt angle adjusting mechanism 33 and the column length adjusting mechanism 37 can be manually released.

Thus, the operator can operate the tilt angle adjusting mechanism 33 and the column length adjusting mechanism 37 together by manually moving the steering wheel 12 and can adjust the position of the steering wheel 12 in accordance with the body type and preference of his/her own. For the subsequent getting on/off, the steering column 13 can be tilted to the tilt-up position and the drive position only by operating the pedal 44 of the tilt-up mechanism 25 in a relaxed posture for the operator. In this case, the tilt-up operation can be repeated while the previous adjusted positions of the tilt angle and the column length are maintained.

Therefore, when an operator different from the operator in the previous work is to sit on the operator's seat 9 and to operate the working mechanism 7, the position of the steering wheel 12 can be adjusted as appropriate in accordance with the body type and preference of the operator by manually operating the tilt angle adjusting mechanism 33 and the column length adjusting mechanism 37 in a state where this operator returns the steering column 13 from the tilt-up position to the drive position close to the operator's seat.

That is, in the tilt angle adjusting mechanism 33, by manually rotating and operating the tilt lever 35 so as to relatively rotate the cylindrical nut 24 in the loosening direction with respect to the connecting bolt 34 from the outside, the connected state between the both can be released. In this state, when the operator moves the steering wheel 12 in the front-rear direction, the upper column 16 can be relatively moved along the elongate hole portion 27B of the tilt-up member 26 (rocking plate 27). As a result, the upper column 16 can be tilted in the front-rear direction with respect to the lower column 14 within the range of an arc of the elongate hole portion 27B, and the tilt angle of the steering column 13 can be finely adjusted.

Moreover, when the column length is to be adjusted along with the adjustment of the tilt angle by using the column length adjusting mechanism 37, the steering wheel 12 is moved in the upper-lower direction, and the upper column 16 is moved in the upper-lower direction with respect to the lower column 14. Therefore, the operator can manually make fine adjustment of the column length of the steering column 13. As described above, after adjustment of the tilt angle and/or the column length, by operating the tilt lever 35 in the opposite direction, the connecting bolt 34 can be rotated with respect to the cylindrical nut 24 from the outside so as to bring the upper column 16 into the connected state and maintained at the position where the tilt angle and the column length are adjusted.

It should be noted that, in the above-described embodiment, the case in which the tilt-up member 26 is composed of the rocking plate 27, the plurality of bolts 28, the bent plate 29, and the cam plate 30 was described as an example. However, the present invention is not limited to that and may be configured such that the tilt-up member 26 is formed as a single member in advance as illustrated in FIGS. 9 and 10, for example.

In the above-described embodiment, the case in which the two tilt-up springs 47 are used for tilting up the upper column 16 of the steering column 13 together with the tilt-up member 26 was described as an example. However, the present invention is not limited to that but may be configured such that the upper column is tilted up together with the tilt-up member by using a spring member formed of a gas spring or other elastic member, for example.

In the above-described embodiment, the case in which the upper column 16 of the steering column 13 is tilted up by performing the stepping-on operation on the pedal 44 was described as an example. However, the present invention is not limited to that but may be configured such that the tilt-up operation of the upper column 16 is performed by manually operating a manual lever different from the tilt lever 35 or a push button and the like, for example.

In the above-described embodiment, the wheel loader 1 configured to be provided with the canopy 10 on the upper side of the operator's seat 9 was described as an example. However, the present invention is not limited to that but can be applied to a construction machine such as a wheel loader configured to be provided with a cab defining an operator's room therein, a wheel type hydraulic excavator, a crane and the like.

Moreover, in the above-described embodiment, the wheel loader 1 was described as an example of a construction machine provided with the steering device 11. However, the present invention is not limited to that but can be widely applied to a construction machine such as a hydraulic excavator, a forklift, a crane and the like provided with a wheel type traveling structure, for example.

DESCRIPTION OF REFERENCE NUMERALS

1: Wheel loader (Construction machine)
2: Vehicle body
7: Working mechanism
8: Floor panel (Floor surface)
9: Operator's seat
11: Steering device
12: Steering wheel
13: Steering column
14: Lower column
14B: Axial support portion
15: Lower shaft
16: Upper column
17: Column frame
17C, 17D: Side plate portion
17C1, 17D1: U-shaped slit (Length adjusting portion)
17C2: I-shaped slit (Length adjusting portion)
18: Mounting post
21: Upper shaft
22: Joint member
23: Lever supporter
23A: Support plate
24: Cylindrical nut (Connecting member)
25: Tilt-up mechanism
26: Tilt-up member
27: Rocking plate
27A, 29C: Pivot portion
27B: Elongate hole portion
29: Bent plate
30: Cam plate
30A: Engage hole
30B: Inclined surface
31, 32: Support shaft
33: Tilt angle adjusting mechanism
34: Connecting bolt (Connecting member)
35: Tilt lever
37: Column length adjusting mechanism
38: Pin holder
38A, 38B: Pin guide
38C: Mounting tube portion
40: Lock pin
40A: Tapered portion
41: Lock spring (Biasing member)
42: Pin operating member
42A: Grip portion
44: Pedal
45: Spring receiving portion
47: Tilt-up spring (Spring member)
48: Cushion member

The invention claimed is:

1. A steering device for construction machine comprising:
a steering column arranged on the front side of an operator's seat of a construction machine and steered by a steering wheel;
a tilt angle adjusting mechanism for adjusting a tilt angle of said steering column;
a column length adjusting mechanism for adjusting a column length of said steering column; and
a tilt-up mechanism provided independently from said tilt angle adjusting mechanism and said column length adjusting mechanism and for tilting up said steering column together with said steering wheel to a tilt-up position away from said operator's seat with respect to a drive position close to said operator's seat; wherein
said tilt-up mechanism is configured to perform a tilt-up operation of said steering column in a state where an adjusted position of said tilt angle and an adjusted position of said column length are maintained, characterized in that:
said steering column is composed of a lower column accommodating a lower shaft for steering having the lower end side fixed to the side of a floor surface of said operator's seat and extending in the upper-lower direction, an upper column accommodating an upper shaft for steering attached to the upper side of said lower column movably in the front-rear direction and the upper-lower direction and extending in the upper-lower direction, and a joint member provided between said lower shaft and said upper shaft and transmitting a steering operation of said steering wheel between said shafts;
between said lower column and said upper column of said steering column, a tilt-up member extending in the upper-lower direction between the both and constituting a part of said tilt-up mechanism is provided;
on said tilt-up member, a pivot portion located in the middle of the length direction and rotatably attached to said lower column and an elongate hole portion for tilt angle adjustment arranged on the upper side of said pivot portion and to which said upper column is connected capable of adjusting said tilt angle are provided;
said tilt angle adjusting mechanism, for performing adjustment of said tilt angle by tilting said upper column in the front-rear direction with respect to said lower column, includes a connecting member, provided on said upper column, connecting said upper column to said elongate hole portion of said tilt-up member, and maintaining said adjusted position of said tilt angle and a tilt lever which releases the connected state of said connecting member, by a rotating operation from the outside so that said upper column can relatively move along said elongate hole portion of said tilt-up member when said tilt angle is adjusted; and
said column length adjusting mechanism performs adjustment of said column length by moving said upper column in the upper-lower direction with respect to said lower column.

2. The steering device for construction machine according to claim 1, wherein
said tilt-up mechanism is provided with a pedal operated by the operator seated on said operator's seat and is configured to tilt up said steering column from said drive position to said tilt-up position in accordance with the operation of said pedal.

3. The steering device for construction machine according to claim 1, wherein
said steering wheel is provided on an upper end of said steering column; and
said tilt-up mechanism is configured to allow said steering column to return from said tilt-up position to said drive position by performing an operation of pulling said steering wheel to the operator side by the operator.

4. The steering device for construction machine according to claim 1, wherein
said column length adjusting mechanism has a length adjusting portion formed on said upper column and extending in the upper-lower direction; and
said length adjusting portion is configured to allow said upper column to move in the upper-lower direction with respect to said lower column when the connected state of said connecting member is released by said tilt lever and regulates movement of said upper column in the upper-lower direction with respect to said lower column so as to maintain said column length at an arbitrary adjusted position when said connecting member is returned to the connected state by said tilt lever.

5. The steering device for construction machine according to claim 1, wherein
said tilt-up mechanism is composed of said tilt-up member arranged extending in the upper-lower direction between said lower column and said upper column and having an intermediate portion in the length direction rotatably attached to said lower column and the upper side connected to said upper column; a lock pin provided on said lower column side capable of displacement in the upper-lower direction and engaged with said tilt-up member all the time so as to position said upper column at said drive position; and
a spring member provided between said tilt-up member and said lower column and tilting up said upper column together with said tilt-up member when the engagement of said lock pin with respect to said tilt-up member is disengaged.

6. The steering device for construction machine according to claim 5, wherein
between said lower column and said lock pin, a biasing member for biasing said lock pin toward said tilt-up member all the time is provided.

7. The steering device for construction machine according to claim 5, wherein
an engage hole engaged with said lock pin is provided in said tilt-up member; and
said lock pin is configured to be formed such that a portion engaged with said engage hole has a tapered shape.

8. The steering device for construction machine according to claim 5, wherein
said tilt-up mechanism is provided with a pedal provided on said lower column side and rotated and operated by the operator seated on said operator's seat; and
said lock pin is configured to be engaged with said tilt-up member until the operator operates said pedal and the engagement with said tilt-up member is disengaged when said pedal is operated.

9. The steering device for construction machine according to claim 5, wherein
on said lower column, a pin holder located on the lower side of said tilt-up member and holding said lock pin capable of displacement is provided by fixing; and
between said pin holder and said lock pin, a biasing member for biasing said lock pin toward said tilt-up member all the time is provided.

10. The steering device for construction machine according to claim 9, wherein
in said pin holder, a pin operating member for displacing said lock pin in the upper-lower direction against said biasing member is provided;
the base end side of said pedal stepped on and operated on the distal end side by the operator seated on said operator's seat is connected to said pin operating member; and
by operating said pin operating member by said pedal, engagement between said tilt-up member and said lock pin is configured to be disengaged against said biasing member.

\* \* \* \* \*